Oct. 25, 1932. H. J. LOUNSBURY 1,884,016
CLUTCH MEANS FOR HAND BRAKES
Filed May 25, 1931
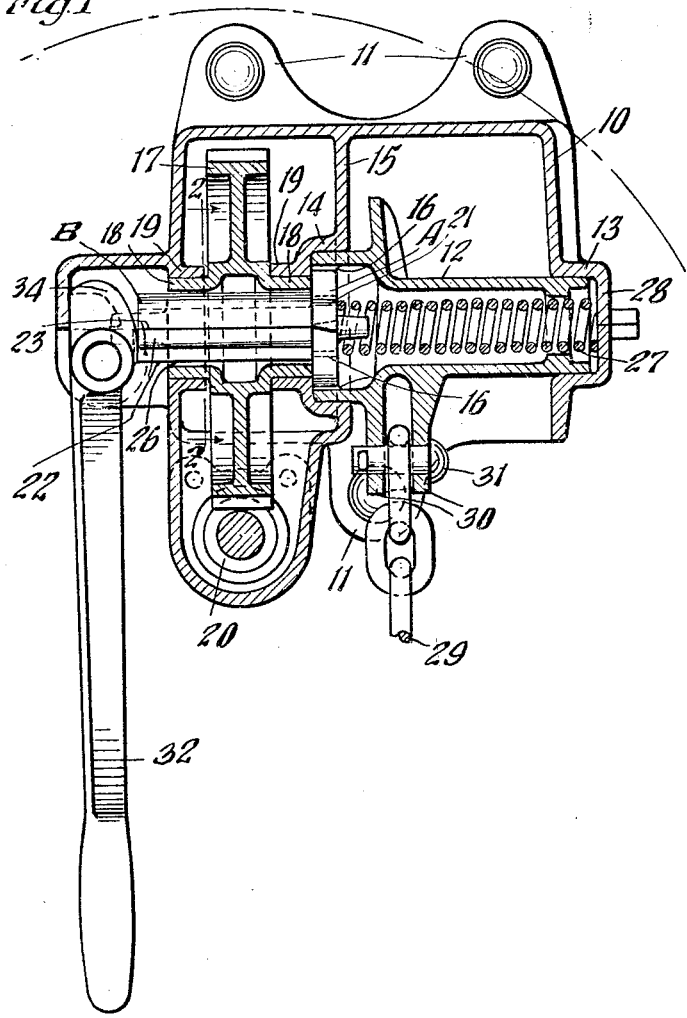
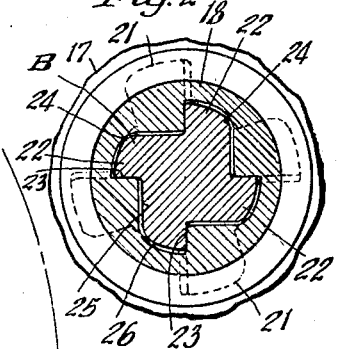
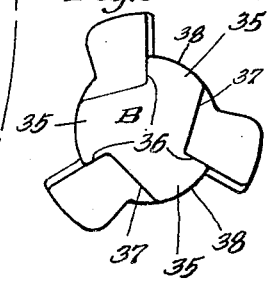
Witness
Wm. Geiger
Inventor
Harvey J. Lounsbury
By Henry Fuchs, Atty.

Patented Oct. 25, 1932

1,884,016

UNITED STATES PATENT OFFICE

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE

CLUTCH MEANS FOR HAND BRAKES

Application filed May 25, 1931. Serial No. 539,771.

This invention relates to improvements in clutch means for hand brakes.

One object of the invention is to provide an improved releasable clutch means for connecting the actuating member to the winding element of a hand brake, so designed as to prevent binding of the same, thereby assuring quick and easy release.

A more specific object of the invention is to provide a sliding clutch member for connecting the rotary actuating member to the winding member of a hand brake, wherein the clutch member has sliding engagement with one of the rotary members but is rotatable in unison therewith at all times and has clutch projections cooperating with complementary clutch means on the other member, the sliding engagement with the first named member being provided by shoulders on the clutch and member respectively engaging along surfaces extending longitudinally of said member and clutch and disposed substantially radial to the axis of rotation thereof.

Other objects of the invention will more clearly appear from the description and claims hereinafter following.

In the drawing, forming a part of this specification, Figure 1 is a vertical sectional view through a hand brake mechanism involving my improvements, the brake mechanism being mounted in a housing secured to the end wall of a railway car. Figure 2 is a vertical sectional view, corresponding substantially to the line 2—2 of Figure 1. And Figure 3 is an end elevational view of a modified form of clutch element involving my improvements.

As shown in the drawing, my improved clutch means is employed in connection with a hand brake mechanism of the power multiplying type including a worm wheel driven by a worm element actuated by the usual hand wheel. As shown in Figure 1, the hand brake mechanism is contained within a housing 10 which is provided with a plurality of securing ears 11—11 by which the same is fixed to the end wall of the car. Any suitable securing elements may be employed for this purpose, rivets being illustrated in the drawing. The brake mechanism proper, to which my improved clutch means is applied, is of substantially the form illustrated in Olander application, Serial No. 472,235, filed August 1, 1930. The housing 10 is made of two sections divided along a horizontal central plane, the sections having part bearing members formed thereon which cooperate with the rotary parts of the brake mechanism. As illustrated in Figure 1, a chain-winding drum 12 is rotatably supported at opposite ends in bearing members 13 and 14 provided in the right-hand side wall of the housing and a transverse partition wall 15. The chain-winding drum is hollow as shown, and has the bearing section at the left-hand end thereof interiorly enlarged and provided with a plurality of internal clutch projections, indicated by 16. A worm wheel 17 is rotatably supported within the housing by bearings 18—18 formed on the hub section thereof and rotatably supported in bearing seats 19—19 provided on the partition wall 15 and the left-hand side wall of the housing, as viewed in Figure 1. The worm wheel is driven by a worm member 20 journaled in the housing below the worm wheel and actuated by the usual hand wheel. The hand wheel is indicated by dotted lines in Figure 1.

In carrying out my invention, I provide a sliding clutch member having a clutch head A and a stem B formed integral therewith. As clearly shown in Figures 1 and 2, the clutch head is accommodated within the enlarged portion of the chain-winding drum and has a plurality of clutch projections 21—21 thereon which cooperate with the interior clutch projections of the drum. The stem B of the sliding clutch element is accommodated within the hub of the worm wheel 17, which hub is hollow as shown. The stem B has a plurality of ribs 22—22 thereon which extend lengthwise of the same and are of the cross-section shown in Figure 2. Each rib 22 has a flat abutment face 23 parallel to the axis of rotation of the clutch element and lying in a plane radial to said axis. At the opposite side, each rib 22 is rounded off, as indicated at 24. The rounded portion 24 of the rib terminates in a flat, longitudinally extending surface 25 which is disposed parallel to the surface 23. The hub section of the worm wheel 17 is interiorly slotted, as indicated at 26—26, said slots conforming in cross-section to the cross-section of the corresponding ribs 22 of the clutch stem B, but being of greater width than the ribs, thereby providing a certain amount of clearance.

The clutch element is held in clutching engagement with the clutch projections of the chain-winding drum 12 by means of a spring 27 disposed within the hollow section of the chain-winding drum and interposed between the clutch head A and an abutment wall 28 formed on the right-hand end wall of the housing 10, as shown in Figure 1. The chain-winding drum has the usual brake chain 29 fixed thereto, the chain being secured in any well-known manner. As shown, the drum 12 is provided with a pair of spaced ears 30—30 between which the end link of the chain is engaged, a securing pin 31 being employed which extends through the ears and said end link.

The clutch element is operated by a lever 32 pivoted in the housing and having a cam head 34 engaging the projecting outer end of the clutch stem B. As will be evident, when the lever is swung to the left and upwardly, as viewed in Figure 1, the clutch element will be forced to the right, thereby disengaging the clutch head from the cooperating clutch projections of the chain-winding drum, thus permitting rotation of the drum with respect to the worm wheel 17 and other parts of the operating mechanism.

Referring to the embodiment of the invention shown in Figure 3, the construction of the clutch element is substantially the same as that hereinbefore described, with the exception that the clutch stem, which is also indicated by B, is provided with three ribs which cooperate with three interior grooves on the hub of the worm wheel. The three clutch projections which are indicated by 35—35—35 in Figure 3 have driving faces 36—36—36 which are in planes radial to the longitudinal axis of the clutch element. Each rib 35 is provided with a flat face 37 on the side opposite to the face 36, said face 37 being disposed in a plane at an angle to the face 36. At the outer side between the faces 36 and 37, each rib is rounded as indicated at 38. The grooves on the hub member of the cooperating worm wheel are of a cross-section similar to the ribs 35 but are of greater width than said ribs so as to provide a certain amount of clearance in a manner similar to that shown in connection with the ribs and grooves illustrated in Figures 1 and 2.

In the operation of my improved clutch mechanism, as shown in the embodiment of the invention in Figures 1 and 2, in tightening the brakes, the worm 20 is rotated by means of the hand wheel in the proper direction to actuate the worm wheel 17 to effect winding of the chain 29 on the drum 12. At this time the worm wheel 17 and drum 12 are connected for rotation in unison by the clutch element which is held in engaging position by the spring 27. In winding the chain, the rotation of the parts is in a clockwise direction, as viewed in Figure 2. As will be clear, the force is thus transmitted from the worm wheel to the clutch element through the cooperating radial surfaces presented by the faces 23—23 of the ribs 22—22 of the clutch element and the contacting side walls of the grooves or slots 26 in the hub of the worm wheel. The force is transmitted from the clutch projections of the head of the clutch element to the cooperating interior projections of the chain-winding drum.

To effect quick or instantaneous release of the brakes, the lever 32 is swung to the left and upwardly, as viewed in Figure 1, thereby forcing the clutch element to the right against the resistance of the spring 27. Inasmuch as the cooperating shouldered engagement between the clutch element and the worm wheel 17 is on radial planes, there is no danger of binding or sticking of the parts, thus greatly reducing the friction opposing sliding movement of the clutch element. Upon the clutch head being disengaged from the clutch projections of the chain-winding drum, the latter will freely rotate with respect to the worm wheel, thus allowing the chain 29 to quickly unwind.

As will be evident, the operation of the clutch member illustrated in Figure 3 is substantially the same as that of the clutch element described in connection with Figures 1 and 2.

From the preceding description, taken in connection with the drawing, it will be evident that I have provided a sliding clutch element which may be easily shifted, due to reduction of friction to a minimum. My improved arrangement has a decided advantage over clutch elements of the sliding type wherein a key or spline is employed to prevent relative rotation of the clutch element and the member carrying the same, or wherein the parts are connected for rotation in unison by means of a square stem on the clutch element slidably engaged within a square socket of the cooperating member, in that the binding due to slight relative rotation of the clutch element and the member in which it is slidably mounted is entirely eliminated. In constructions involving either a splined connection or a connection of the square stem and socket type, the parts must be fitted with sufficient looseness to facilitate sliding of the clutch element. The clearance which is necessary for this purpose will allow slight relative rotation of the parts, thus destroying the flat surface contact between the cooperating driving faces and causing the corners of the spline or stem of square cross-section to dig into the cooperating faces, with resultant sticking of the clutch. In my improved construction the engagement being along faces which are substantially radial to the axis of rotation of the clutch element, there is at all times true flat surface contact between the driving faces, thus preventing the digging in hereinbefore referred to.

I have herein shown and described what I now consider the preferred manner of carrying out my invention, but the same is merely illustrative and I contemplate all changes and modifications that come within the scope of the claims appended hereto.

I claim:

1. In clutch means for hand brake mechanisms including a rotary driving member and a rotary chain-tightening member which are coaxial, the combination with a clutch element slidable axially within one of said members, said element having clutch projections extending lengthwise of the same engaging longitudinally extending interior grooves formed in the member in which said element is slidable, said clutch projections having shouldered engagement with the walls of said grooves along surfaces extending lengthwise thereof and radial to the longitudinal axis of said clutch element, whereby said element and member are rotatable in unison; of a clutch head rigid with said element, said clutch head and the other member having cooperating clutch formations thereon; a spring yieldingly holding said clutch head engaged with said last named member; and manually operated lever means for sliding said clutch element lengthwise of said members against the resistance of the spring to disengage the head and permit relative rotation of said members.

2. In clutch means for hand brake mechanisms including a rotary actuating member and a rotary chain-winding member, said members being coaxial and having aligned openings, the combination with a clutch element headed at one end and having a stem slidable within the opening of one of said members, said last named member having interior slots in the walls of the opening thereof extending lengthwise of the same with one of the walls of each slot in a plane radial to the longitudinal axis of said member, said stem having a plurality of spaced, longitudinally extending ribs engageable within the interior slots in the member in which said stem is slidable, each of said ribs having a longitudinally disposed face in a plane radial to the longitudinal axis of said stem and engageable with the radial wall of the corresponding slot of said rotary member, said slots being of greater width than said ribs, said clutch head and the other member having cooperating clutch projections; of means for yieldingly holding said clutch head engaged with the last named member; and manually operated for sliding said clutch element to disengage the clutch projections of the head from the cooperating projections to release the clutch and allow relative rotation of said members.

3. In clutch means for hand brake mechanisms including a rotary actuating member and a coaxial rotary chain-winding member, the combination with a clutch element headed at one end and having a stem slidable within the opening of one of said members, said stem having a plurality of longitudinally extending ribs engaging within grooves provided on the member within which the stem is slidable, each of said ribs having a face on one side disposed in a plane radial to the axis of rotation of the clutch element and having a face on the opposite side parallel to said first named face, said head and the other member having cooperating clutch projections; of means for yieldingly holding said clutch engaged; and manually operated lever means for sliding said clutch element to disengage the same and permit relative rotation of said members.

4. In clutch means for hand brake mechanisms including a rotary actuating member and a coaxial rotary chain-winding member, said members having aligned axial openings, the combination with a clutch element having a stem slidable within the opening of one of said members, said stem having four ribs disposed lengthwise of the same and engaging within grooves formed in the member in which the stem is slidable, said ribs and grooves having interengaging driving faces lying in planes radial to the longitudinal axis of rotation of said clutch element; of clutch projections on the other member; clutch projections on said element cooperating with the clutch projections on the last named member; means for yieldingly holding said clutch engaged; and manually operated means for shifting said clutch element to disengage the same, thereby permitting relative rotation of said members.

In witness that I claim the foregoing I have hereunto subscribed my name this 23rd day of May, 1931.

HARVEY J. LOUNSBURY.

CERTIFICATE OF CORRECTION.

Patent No. 1,884,016.                                                     October 25, 1932.

HARVEY J. LOUNSBURY.

It is hereby certified that error appears in the printed specification of the above numbered patent requiring correction as follows: Page 3, line 67, claim 2, after the word "operated" insert the word means; and that the said Letters Patent should be read with this correction therein that the same may conform to the record of the case in the Patent Office.

Signed and sealed this 29th day of November, A. D. 1932.

(Seal)                                                                M. J. Moore,
Acting Commissioner of Patents.